April 24, 1962     I. STOLLMAN     3,031,037
CASTER STRUCTURE
Filed Sept. 12, 1960
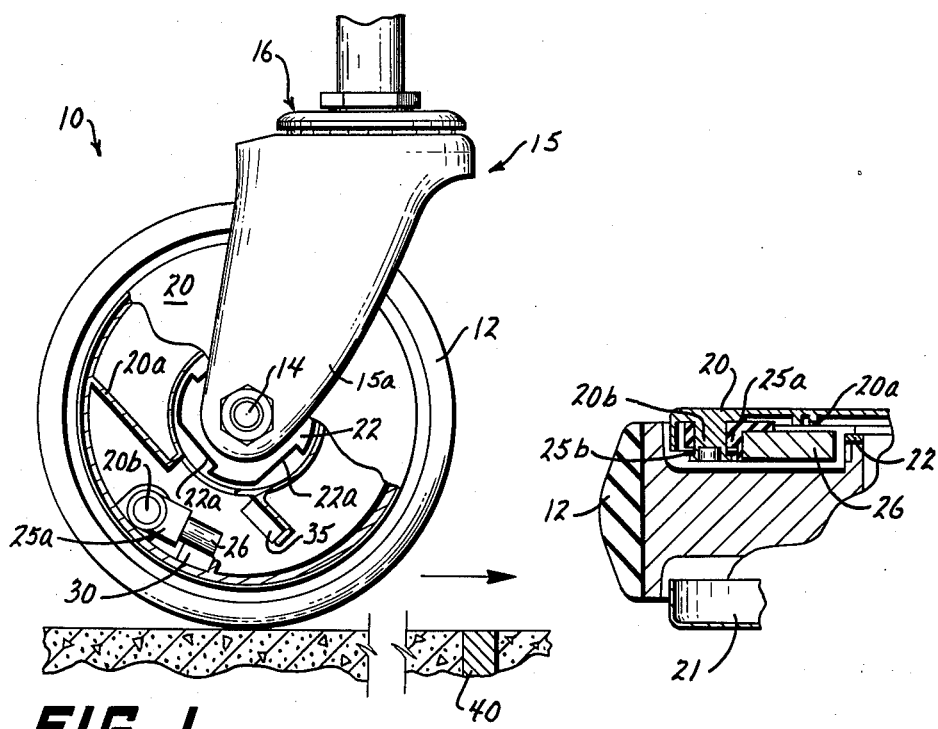
FIG. 1
FIG. 3
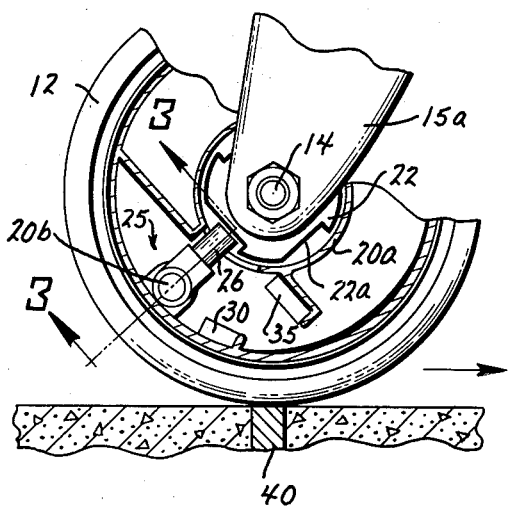
FIG. 2
INVENTOR.
IRVING STOLLMAN
BY
Lockwood Woodard Smith & Weikart
Attorneys United States Patent Office 3,031,037
Patented Apr. 24, 1962

3,031,037
CASTER STRUCTURE
Irving Stollman, 18440 Greenfield, Detroit, Mich.
Filed Sept. 12, 1960, Ser. No. 55,461
7 Claims. (Cl. 188—111)

The present invention relates to a caster structure, and more particularly to a new and novel magnetic brake type caster which performs a locking function whenever the caster is moved through a magnetic field. The present invention represents an improvement over the magnetic wheel lock disclosed and claimed in the pending Hyman Chait patent application Serial No. 853,241, filed November 16, 1959.

The aforesaid pending Chait patent application is directed to magnetic structure for locking a wheel against rotational displacement. Such structure has particular application, for example, in connection with the wheel assemblies for movable carts, such as those commonly found at supermarkets or the like. The desired locking results of the chait invention are achieved by imbedding a magnetic barrier around a given periphery of the property being protected, whereupon with the passage of the magnetically equipped wheels thereover, such wheels are locked against further rotational displacement and, hence, the cart is prevented from being rolled from the premises. In broad terms, the above-indicated locking action results by the engagement of a magnet pivotally disposed on the supporting frame around the wheel with a stop means positioned on the wheel, when, as noted hereabove, the wheel passes through a magnetic barrier.

By virtue of the instant invention, the applicant has provided a new and improved structure for achieving the desired locking of a rotatable wheel against displacement by means of magnetic action. Specifically, the applicant herein has provided a pivotal sensor or magnet which is normally disposed in a cushioned position on a urethane damper, the latter maintaining the magnet in a position which is free from external shock and, thereby, preventing premature locking action due to triggering from vibrations. The preceding positioning is accomplished by the use of a magnetic damper, disposed proximate the pivotal magnet, and having a like polarity.

When, however, the caster wheel passes through a magnetic barrier, typically imbedded below the surface on which the wheel is rolling, the pivotal magnet overcomes the magnetic force exerted thereon by the magnetic damper, whereupon the magnet swings into a position which locks the wheel against further turning. In order to accomplish the preceding, the magnetic force from the magnetic barrier and the pivotal magnet or sensor combine to overcome the magnetic force exerted on the latter by the magnetic damper, hence, always assuring that the sensor will be in its normal cushioned position unless the caster assembly is traveling through the requisite magnetic barrier.

Accordingly, the principal object of the present invention is to provide a new and improved magnetic type caster assembly.

Another object of the present invention is to provide a new and improved magnetic type caster assembly which is defined by a pivotal sensor member normally retained in a cushioned position by a magnetic barrier.

A further object of the present invention is to provide a new and improved magnetic type caster assembly which is readily operable upon the traveling thereof through a magnetic barrier to lock the structure against further turning or rotation.

A still further and more general object of the present invention is to provide a new and improved magnetic type caster assembly made from a minimum number of components which combine to achieve effective locking action with desired long-life characteristics.

Other objects and a better understanding of the invention will become more apparent from the following description, taken in conjunction with the accompanying drawing, wherein FIG. 1 is a view in side elevation, partly broken away, showing the new and improved magnetic type caster assembly in accordance with the instant invention, with the wheel thereof being in an unlocked position;

FIG. 2 is a fragmentary view in side elevation showing the caster assembly of FIG. 1 in a locked position; and, FIG. 3 is a view in cross section, partly fragmentary, taken at line 3—3 of FIG. 2 and looking in the direction of the arrows, showing further details of the invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, a caster assembly 10 is disclosed which broadly comprises a wheel 12 rotatably disposed on a bolt (not shown) which is secured by a nut 14 between the lower portions of depending arms 15a (only one of which is shown in the drawing) forming a framework or support assembly 15, the latter including a bearing assembly 16 for effecting rotation of the caster assembly 10, structure all well-known in the art. The support assembly 15 is typically formed from steel, while the rotatable wheel 12 is preferably made from a molded rubber, with the hub (not shown) of the wheel 12 including bearings (also not shown) for effecting rotation of the wheel 12.

Specifically, the instant invention comprises a brake housing member 20 which is fixedly positioned, when assembled, adjacent one of the depending arms 15a of the support assembly 15, while on the opposite side of the wheel 12, a cover plate 21 is also fixedly positioned, when assembled, with respect to the other depending arm (not shown) of the support assembly 15. The brake housing member 20 typically includes a series of webs or ribs 20a on the inner surface thereof for purposes of strength or reinforcement, with a larger projection 20b (see FIG. 3) also extending therefrom. Positioned around and secured to the hub of the wheel 12 is a hub plate 22, typically made from metal, which has a series of angled cutout portions 22a formed on its periphery, the latter serving as part of the locking structure, as will be understood from the following description.

The magnet or sensor assembly 25 for the locking structure comprises a nonmagnetic type holder 25a, typically formed from plastic or like material, rotatably mounted on the arm or projection 20b extending from the brake housing member 20 and secured thereon by means of a retainer 25b, which holder 25a receives a magnet or sensor 26 in an opening therein. A damper 30 is positioned on a portion of the reinforcement webs 20a on the inner surface of the brake housing member 20 such damper 30 typically being made from urethane plastic, and affixed in position by adhesive means. Another web or rib disposed on the inner surface of the brake housing member 20 positions a magnetic damper 35 which is also typically affixed thereto by adhesive means. In a normal non-locking position of use (see FIG. 1), the sensor assembly 25 and, hence, the sensor magnet 26 is disposed on the urethane damper 30, while to afford locking action, the sensor assembly 25 pivots on the projection 20b formed on the brake housing member 20 to the position of FIG. 2. The overall structure is completed by a representation in FIGS. 1 and 2 of the drawing of a magnetic barrier 40 which is imbedded in concrete or like material over which the caster wheel 12 is caused to travel.

As should be apparent from the preceding discussion, the parts forming the instant magnetic type caster assembly 10 are assembled so that the wheel 12 thereof is freely rotatable on the bolt which extends between the brake housing member 20 and the cover plate 21. When the caster assembly 10 is traveling over a nonmagnetic surface, the magnetic damper 35 exerts a magnetic force on the sensor or magnet 26 which, due to like polarities of the pivotal extreme of the magnet 26 and the facing side of the magnetic damper 35, causes the sensor 26 to be maintained on the urethane damper 30. The latter positioning is important to prevent the undue transmission of external shock to the sensor or magnet 26 and to thereby preclude the triggering of the latter and, hence, premature locking.

When, however, the wheel 12 is caused to travel over the magnetic barrier 40, represented by the movement of the overall caster assembly 10 in the direction of the arrows of FIGS. 1 and 2, the sensor assembly 25, and hence, the magnet or sensor 26, moves from its normal position on the urethane damper 30 to an ultimate position where it engages and is disposed between an angled cutout portion on the hub plate 22 and a portion of the webs 20a disposed on the inner surface of the brake housing member 20 (see FIG. 2). Such movement is effected since the magnetic barrier 40 also has a like polarity on its upper surface with that of the sensor or magnet 26, as well as the magnetic damper 35, resulting in movement of the sensor or magnet 26 when the magnetic forces of the magnetic barrier 40 and the magnet 26 combine and overcome the magnetic force of the magnetic damper 35. The engaging or wedging of the magnet or sensor 26 between an angled cutout portion 22a on the hub plate 22 and a portion of the webs 20a on the inner surface of the brake housing member 20 results when the sensor 26 is initially urged into one of the angled cutout portions 22a on the hub plate 22 as the wheel 12 first travels in the magnetic field of the magnetic barrier 40, and then ultimately the sensor 26 moves into the aforesaid wedged relationship.

From the preceding, it should be apparent that the applicant has provided a new and improved magnetic type caster assembly having a pivotal locking member, represented by a magnet, which is normally disposed on a urethane damper, through the novel use of a magnetic damper, to prevent undue external shock being transmitted thereto. It should be obvious that the invention permits ready adaptation to a wide number of applications, including, for example, the aforementioned locking of the wheels of a cart commonly found in a supermarket or the like.

The applicant's new and improved magnetic type caster assembly is susceptible to various changes within the spirit of the invention as, for example, changes of dimensioning as well as choice of material. Thus, the above description should be considered illustrative and not as limiting the scope of the following claims.

I claim:

1. A braking structure for a wheel comprising a supporting framework for said wheel, a first magnetic means pivotally mounted on said supporting framework, said first magnetic means being disposed in a first position by a second magnetic means mounted on said supporting framework, and movable to a second position by a stationary third magnetic means disposed independently of said supporting framework, and means on said wheel cooperable with said first magnetic means for locking said wheel against rotational displacement at said second position when said first magnetic means is brought into proximity with said third magnetic means.

2. A braking structure for a wheel comprising a framework mounting said wheel, locking means pivotally mounted on said framework, and means on said wheel cooperable with said locking means for locking said wheel against rotational displacement, said locking means being a first magnet means disposed in an unlocking position by a second magnetic means mounted on said supporting framework, and movable to a locking position by a stationary third magnetic means disposed independently of said framework when said first magnetic means is brought into proximity with said third magnetic means.

3. The braking structure of claim 2 where said stationary third magnetic means is embedded in a surface on which said wheel travels.

4. A braking structure for a wheel comprising a framework mounting said wheel, locking means pivotally mounted on said framework, and means on said wheel cooperable with said locking means for locking said wheel against rotational displacement, said locking means being a magnet disposed in an unlocking position by a second magnetic means mounted on said supporting framework, and movable to a locking position by a stationary third magnetic means disposed independently of said framework when said magnet is brought into proximity with said third magnetic means, and wherein cushioning material is disposed on said framework for receiving said magnet at said unlocking position.

5. The braking structure of claim 4 wherein said magnet defining said locking means, said second magnetic means and said third magnetic means are each of like polarity.

6. A braking structure for a wheel comprising a framework mounting said wheel, magnetic locking means pivotally mounted on said framework, means on said wheel cooperable with said magnetic locking means, a first magnetic means mounted on said supporting framework retaining said magnetic locking means in a normal unlocking position, and a second magnetic means stationary and independent of said supporting framework moving said magnetic locking means into locking engagement with said means on said wheel when said magnetic locking means is brought into proximity with said second magnetic means.

7. The braking structure of claim 6 where said magnetic locking means, said first magnetic means and said second magnetic means each establish a magnetic field of like polarity, and where said locking engagement is effected when the combined magnetic field is established by said magnetic locking means and said second magnetic means is greater than the magnetic field established by said first magnetic means.

References Cited in the file of this patent

UNITED STATES PATENTS

| | | |
|---|---|---|
| 1,632,435 | Darnell | June 14, 1927 |
| 1,785,421 | Nielsen | Dec. 16, 1930 |
| 2,964,140 | Berezny | Dec. 13, 1960 |

OTHER REFERENCES

The Condensed Chemical Dictionary, published by Reinhold (N.Y.), 1956 (page 451 relied on).